United States Patent
Ishii et al.

(10) Patent No.: US 7,991,719 B2
(45) Date of Patent: Aug. 2, 2011

(54) INFORMATION PROCESSING METHOD AND APPARATUS, AND IMAGE PICKUP DEVICE

(75) Inventors: Mie Ishii, Machida (JP); Masakazu Matsugu, Yokohama (JP); Katsuhiko Mori, Kawasaki (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 11/579,981

(22) PCT Filed: Jun. 2, 2005

(86) PCT No.: PCT/JP2005/010535
§ 371 (c)(1),
(2), (4) Date: Nov. 9, 2006

(87) PCT Pub. No.: WO2005/119589
PCT Pub. Date: Dec. 15, 2005

(65) Prior Publication Data
US 2007/0244842 A1 Oct. 18, 2007

(30) Foreign Application Priority Data
Jun. 3, 2004 (JP) .................. 2004-166136

(51) Int. Cl.
*G06N 3/00* (2006.01)
(52) U.S. Cl. ...................................................... 706/28
(58) Field of Classification Search ..................... 706/28
See application file for complete search history.

(56) References Cited

U.S. PATENT DOCUMENTS

| | | | |
|---|---|---|---|
| 5,220,559 | A | 6/1993 | Tsuzuki et al. |
| 5,636,327 | A | 6/1997 | Nakahira et al. |
| 6,606,407 | B1 | 8/2003 | Takahashi et al. |
| 6,650,778 | B1 | 11/2003 | Matsugu et al. |
| 6,674,902 | B1 | 1/2004 | Kondo et al. |
| 6,674,905 | B1 | 1/2004 | Matsugu et al. |
| 6,728,400 | B1 | 4/2004 | Matsugu |

(Continued)

FOREIGN PATENT DOCUMENTS

JP 2064787 B2 3/1990

(Continued)

OTHER PUBLICATIONS

Matsugu et al ("Convolutional Spiking Neural Network Model for Robust Face Detection" Proceedings of the 9th International Conference on Neural Information Processing; vol. 2, 2002), pp. 660-664.*

(Continued)

*Primary Examiner* — Jeffrey A Gaffin
*Assistant Examiner* — Lut Wong
(74) *Attorney, Agent, or Firm* — Fitzpatrick, Cella, Harper & Scinto

(57) ABSTRACT

An output value of neuron within an objective layer of a hierarchical neural network is computed. The data of the output value of neuron is stored in a memory only if the output value of neuron is greater than or equal to a predetermined value by referring to the computed output value of neuron within the objective layer. When the data of the output value of neuron on a former layer of objective layer is read from the memory, the data having a predetermined value is read, instead of the data of the output value of neuron not stored in the memory.

5 Claims, 12 Drawing Sheets

U.S. PATENT DOCUMENTS

| | | | |
|---|---|---|---|
| 6,987,535 | B1 | 1/2006 | Matsugu et al. |
| 7,076,099 | B2 | 7/2006 | Kondo et al. |
| 7,088,860 | B2 | 8/2006 | Matsugu et al. |
| 2006/0228027 | A1 | 10/2006 | Matsugu et al. |

FOREIGN PATENT DOCUMENTS

| | | |
|---|---|---|
| JP | 6-004506 | 1/1994 |
| JP | 6-006793 | 1/1994 |
| JP | 6-083796 | 3/1994 |
| JP | 7-175778 | 7/1995 |
| JP | 2679730 B2 | 11/1997 |
| JP | 3172278 B2 | 3/2001 |

OTHER PUBLICATIONS

Lecun, Y. and Bengio, Y., "Convolutional Network for Images Speech, and Time Series" Handbook of Brain Theory and Neural Networks (M. Arbib, Ed.), MIT Press, 1995, p. 255-258.

* cited by examiner

F I G. 11

INFORMATION PROCESSING METHOD AND APPARATUS, AND IMAGE PICKUP DEVICE

TECHNICAL FIELD

The present invention relates to a technique for performing arithmetical processing for a hierarchical neural network.

BACKGROUND ART

Conventionally, in the field of image recognition or speech recognition, a recognition processing algorithm specified for a specific recognition object can generally be performed either using computer software or using a dedicated parallel image management processor (SIMD, MIMD machine and so on).

As an example of the latter approach, i.e., a dedicated parallel management processor, a conventional object recognition device has a plurality of image management processor units, in which an arithmetical operation is performed with DSPs (digital signal processors) mounted on those processor units, and a plurality of results are transferred to an additional unit for making the object recognition (e.g., refer to Japanese Patent Application Laid-Open No. 6-6793). For example, an image is divided into plural areas, which are processed in parallel by the processor units, and the inference for the recognition of the object is made by the additional processor unit, employing the neural network and fuzzy control.

As hardware which performs hierarchical parallel processing using a neural network, for example, a conventional hierarchical structure neural network has an architecture in which a single layer of hardware is used in time division multiplexing and stratified. In other words, a neural network formed by interconnecting a plurality of neuron models includes,
(i) a single layer unit aggregation means which forms a unit aggregate of single layer by installing a plurality of neuron model units that can output a voltage through a non-linear output function in time division, by generating the product of a time division multiplexed analog signal and digital weight data from an outside source and then adding or integrating the product through a capacitor in time division, (ii) feedback means for feeding back the output of the single layer unit aggregation means to an input part of the same unit aggregate of the single layer, and (iii) control means that controls an analog signal from each unit that is outputted by the single layer unit aggregation means in time division multiplexing and controls the single layer unit aggregation means through the feedback means to be employed in time division multiplexing, whereby the neural network having the hierarchical structure is equivalently formed by using the unit aggregation means having a single layer structure in time division multiplexing (e.g., refer to Japanese patent No. 2679730).

On the other hand, a neural network is a mathematical network that is formed based on an information processing system of the brain. Many methods for recognizing and classifying the pattern in an image using a hierarchical neural network have been recently proposed. For example, there is a neural network of the multi-layer perceptron type in which the learning occurs by error back propagation, as is generally widely known. This neural network of the multi-layer perceptron type prepares a number of units equaling the order of the input vector, as an input layer, and the number of categories to be distinguished, as an output layer, and further prepares a sufficient number of middle layers and units, all the units being connected.

For example, a conventional neural network circuit is a multi-layer neural network circuit that recognizes and processes the feature data of a given image by performing the arithmetic operation of the network, in which it is aimed to construct this circuit with small-scale hardware, and to recognize the recognition object of concern at high speed (e.g., refer to Japanese patent No. 03172278). To this end, the speed-up of the operation is effected by performing the operation only for a network having an effective coupling coefficient.

Moreover, another conventional signal processing device consists of a network which combines a plurality of neuronal cell imitation elements with a learning function, each of which inputs plural signals and outputs one signal, in which signal information deletion means for deleting the redundant or unnecessary information of inputs (or outputs) is provided on each of the input side and the output side of the network (e.g., refer to Japanese Patent Application Laid-Open No. 6-83796).

In the image processing requiring an enormous amount of computation as described above, high-speed operation is being realized through parallel processing by special-purpose machines. However, the amount of computation increases as the object to be recognized becomes more complex.

In view of the hardware of the neural network, it is expected that the scale becomes larger to make more complicated processing, considering the number of brain cells of a living body. When the hardware is realized by the conventional method, the number of coupled neurons becomes so enormous that the operation speed of the parallel processing is limited. Also, when the chips mounted on the product are fabricated, it is desired that the size of the circuit and the consumption electric power are made smaller.

In the neural network circuit as disclosed in the above Japanese patent No. 03172278, though the arithmetical operation processing speed is increased by performing the arithmetical operation only for the network of which the coupling coefficient is effective, or not zero, when a noise component is contained in the value of the coupling coefficient, no measurement is taken, whereby the arithmetical operation is finally performed. Moreover, learning of the weight coefficient is not made when the coupling coefficient is 0, because the weight coefficient is updated only for the neurons with a coupling coefficient other than for 0. In other words, universality is expected to be lacking.

Moreover, in the signal processing device as disclosed in Japanese Patent Application Laid-Open No. 6-83796, though the signal information deletion means for deleting the redundant or unnecessary information from the input or output is provided to make the learning easier, the weight coefficient is not learned for the deleted part, as in Japanese patent No. 03172278.

DISCLOSURE OF INVENTION

The present invention has been achieved in the light of the above-mentioned problems, and it is a first object of the invention to reduce the needed amount of memory, when a pattern recognition process is performed with a neural network.

Also, it is a second object of the invention to reduce the computation amount involving the arithmetical operation of this neural network.

Also, it is a third object of the invention to reduce the operation processing amount as described in the first and second objects, and the memory use amount, and to realize excellent universality in the learning of the weight coefficient at high speed and in the pattern recognition.

In order to achieve an object of the present invention, for example, an information processing apparatus of the present invention comprises the following arrangement.

That is, an information processing apparatus for detecting a predetermined pattern in an input image by a process employing a hierarchical neural network in which a plurality of detection layers and integration layers are arranged alternately, the detection layer detecting and outputting one or more feature amounts from the output of the integration layer at the former stage and the integration layer integrating the outputted features from the detection layer at the former stage and outputting the result of integration, comprising:

output value computation means for computing an output value of neuron within an objective layer, using an output value of neuron within a former layer of the objective layer and a weight coefficient between the objective layer and the former layer, sequentially by setting each layer as the objective layer;

first storage control means for storing data of the output value, which is greater than or equal to a predetermined value, in a memory by referring to the output value of each neuron within the detection layer computed by the output value computation means;

second storage control means for storing data of the output value of each neuron within the integration layer computed by the output value computation means, in the memory; and supply means for supplying the data of the output value of neuron within the former layer of the objective layer to the output value computation means by reading the data of the output value from the memory and supplying the data having a predetermined value instead of the data of the output value of neuron not stored in the memory.

In order to achieve an object of the present invention, for example, an information processing apparatus of the present invention comprises the following arrangement.

That is, an information processing apparatus for modifying a weight coefficient between layers to obtain a desired output in a hierarchical neural network in which a plurality of detection layers and integration layers are arranged alternately, the detection layer detecting and outputting one or more feature amounts from the output of the integration layer at the former stage and the integration layer integrating the outputted features from the detection layer at the former stage and outputting the result of integration, comprising:

output value computation means for computing an output value of neuron within an objective layer, using an output value of neuron within a former layer of the objective layer and a weight coefficient between the objective layer and the former layer of the objective layer;

storage control means for storing data of the output value, which is greater than or equal to a predetermined value, in a memory by referring to the output value of each neuron within the processing object layer computed by the output value computation means;

modification means for modifying the weight coefficient between the objective layer and the former layer of the objective layer, based on an error between the data of the output value of the objective layer consisting of the data of the output value stored in the memory and the data having a predetermined value instead of the data of the output value of neuron not stored in the memory and the data of the desired output; and supply means for supplying the data stored in the memory by the storage control means, which is referred to by the output value computation means to compute the output value of each neuron within the objective layer, to the output value computation means by reading the data of the output value from the memory.

In order to achieve an object of the present invention, for example, an information processing method of the present invention comprises the following arrangement.

That is, an information processing method for detecting a predetermined pattern in an input image by making a computation process employing a hierarchical neural network in which a plurality of detection layers and integration layers are arranged alternately, the detection layer detecting and outputting one or more feature amounts from the output of the integration layer at the former stage and the integration layer integrating the outputted features from the detection layer at the former stage and outputting the result of integration, comprising:

an output value computation step of computing an output value of neuron within an objective layer, using an output value of neuron within a former layer of the objective layer and a weight coefficient between the objective layer and the former layer of the objective layer, sequentially with setting each layer as the objective layer;

a first storage control step of storing data of the output value, which is greater than or equal to a predetermined value, in a memory by referring to the output value of each neuron within the detection layer computed in the output value computation step;

a second storage control step of storing data of the output value of each neuron within the integration layer computed in the output value computation step, in the memory; and a supply step of supplying the data of the output value of neuron within the former layer of the objective layer, which is referred to in the output value computation means, by reading the data of the output value from the memory and supplying the data having a predetermined value instead of the data of the output value of neuron not stored in the memory.

In order to achieve an object of the present invention, for example, an information processing method of the present invention comprises the following arrangement.

That is, an information processing method for modifying a weight coefficient between layers to obtain a desired output in a hierarchical neural network in which a plurality of detection layers and integration layers are arranged alternately, the detection layer detecting and outputting one or more feature amounts from the output of the integration layer at the former stage and the integration layer integrating the outputted features from the detection layer at the former stage and outputting the result of integration, comprising:

an output value computation step of computing an output value of neuron within an objective layer, using an output value of neuron within a former layer of the objective layer and a weight coefficient between the objective layer and the former layer of the objective layer;

a storage control step of storing data of the output value, which is greater than or equal to a predetermined value, in a memory by referring to the output value of each neuron within the processing object layer computed in the output value computation step;

a modification step of modifying the weight coefficient between the objective layer and the former layer of the objective layer, based on an error between the data of the output value of the objective layer consisting of the data of the output value stored in the memory and the data having a predetermined value instead of the data of the output value of neuron not stored in the memory and the data of the desired output; and supply means for supplying the data stored in the memory in the storage control step, which is referred to in the output value computation step to compute the output value of each neuron within the objective layer, to the output value computation step by reading the data of the output value from the memory.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 11 is a view showing an example of an image containing a complex background (where many V-character patterns are likely to be detected) behind the figure image.

BEST MODE FOR CARRYING OUT THE INVENTION

Preferred embodiments of the present invention will now be described in detail in accordance with the accompanying drawings.

First Embodiment

Figure 1:
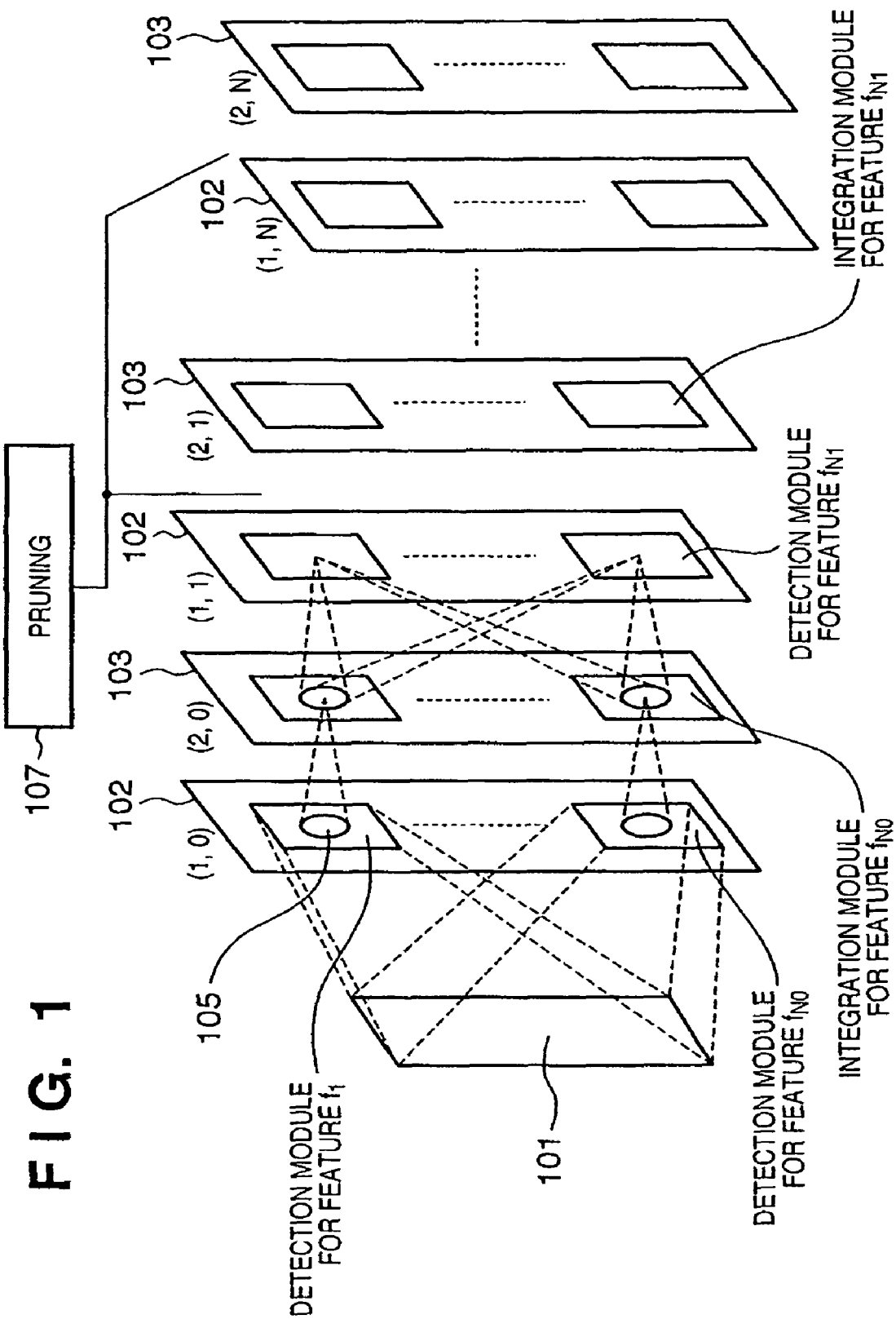
FIG. 1 is a view showing the configuration of a hierarchical neural network according to a first embodiment of the present invention.

FIG. 1 is a view showing the configuration of a hierarchical neural network according to an embodiment of the present invention. The neural network is formed to perform image recognition through a parallel hierarchical process. This neural network hierarchically deals with the information concerning the recognition of an object or a geometrical feature in a local area of the input data, in which its basic structure has a so-called Convolutional network structure (Lecun, Y. and Bengio, Y., 1995, "Convolutional Network for Images Speech, and Time Series" in Handbook of Brain Theory and Neural Networks (M. Arbib, Ed.), MIT Press, p. 255-258). The output from a final layer (uppermost layer, corresponding to a layer 103 in the same figure (2, N)) is the category of an object recognized as the recognition result and the positional information on the input data.

A data input layer 101 is a layer for inputting the local area data from a photoelectric transfer element such as a CMOS sensor or a CCD element. A first feature detection layer 102 (1,0) detects the local low order features (geometric features such as a specific direction component and a specific spatial frequency component and color component features, as necessary) of an input image (image pattern) inputted from the data input layer 101 in the local area (or local area around each of the sampling points over the entire screen) around each position of the input image, at multiple scale levels or resolutions by the number of feature categories at the same position.

A feature integration layer 103 (2,0) has a predetermined receptor field structure (in the following, receptor field means a coupling range of the immediately previous layer with the output element, and receptor field structure means a distribution of coupling load), and performs the integration (such as sub-sampling operation by local averaging or maximum output detection) of plural neuron output elements within the same receptor field from the feature detection layer 102 (1,0). This integration process spatially obscures the output from the feature detection layer 102 (1,0) to play a role of permitting dislocation or deformation. Also, each receptor field of a neuron within the feature integration layer has a common structure for neurons within the same layer.

As for each feature detection layer 102 ((1,1), (1,2), ..., (1,M)) and each feature integration layer 103 ((2,1), (2,2), ..., (2,M)), which are succeeding layers, like each layer as previously described, the former ((1,1), (1,2), ..., (1,M)) detect plural different features in each feature detection module, and the integration layers ((2,1), ...) integrate the detection results concerning the features from the feature detection layer at the former stage. The former feature detection layer is coupled (wired) to receive the cellular element output of the feature integration layer at the former stage. The sub-sampling that is performed on the feature integration layer averages the outputs from the local area (local receptor field of neuron on the feature integration layer) from a feature detection cell group of the same feature category.

In the above way, the hierarchical neural network used in this embodiment has a configuration in which the detection layers and the integration layers are alternately arranged. In the following explanation, the hierarchical neural network with N=2, namely, three sets of feature detection layer and feature integration layer is employed.

Next, an instance where the object detected from the input image is the eyes will be described below. That is, when an input image including an image of eyes is inputted into the data input layer 101 of FIG. 1, one series of processes for recognizing the "eyes" employing the hierarchical neural network of FIG. 1 will be described below.

Figure 2:
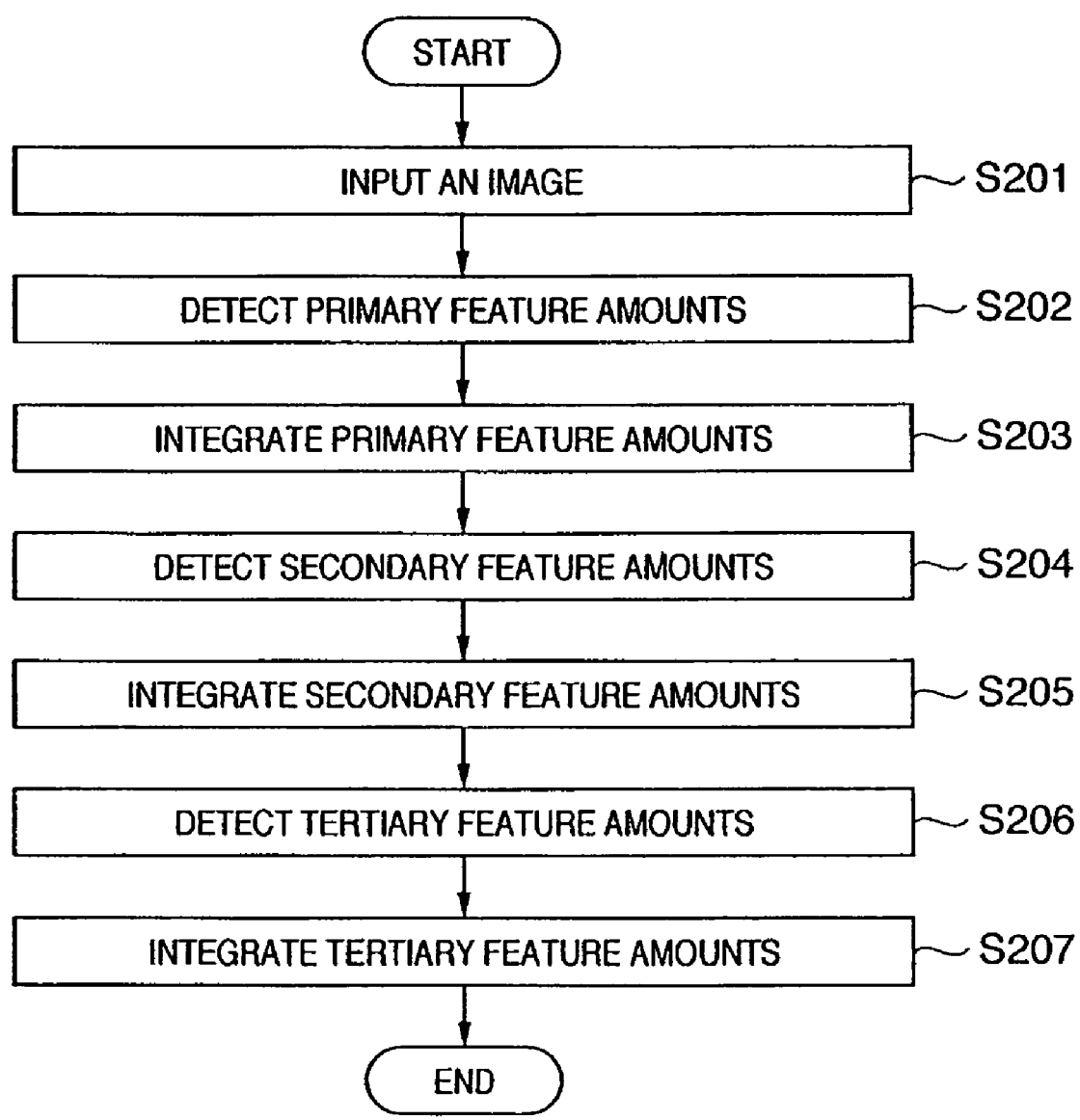
FIG. 2 is a flowchart showing a process for detecting the eyes from an input image.

FIG. 2 is a flowchart showing a process for detecting the eyes from an input image. First of all, an input image is inputted into the data input layer 101 at step S201. Subsequently, at step S202, the feature detection layer 102 (1,0) detects the primary feature amounts from this input image.

Figure 3:
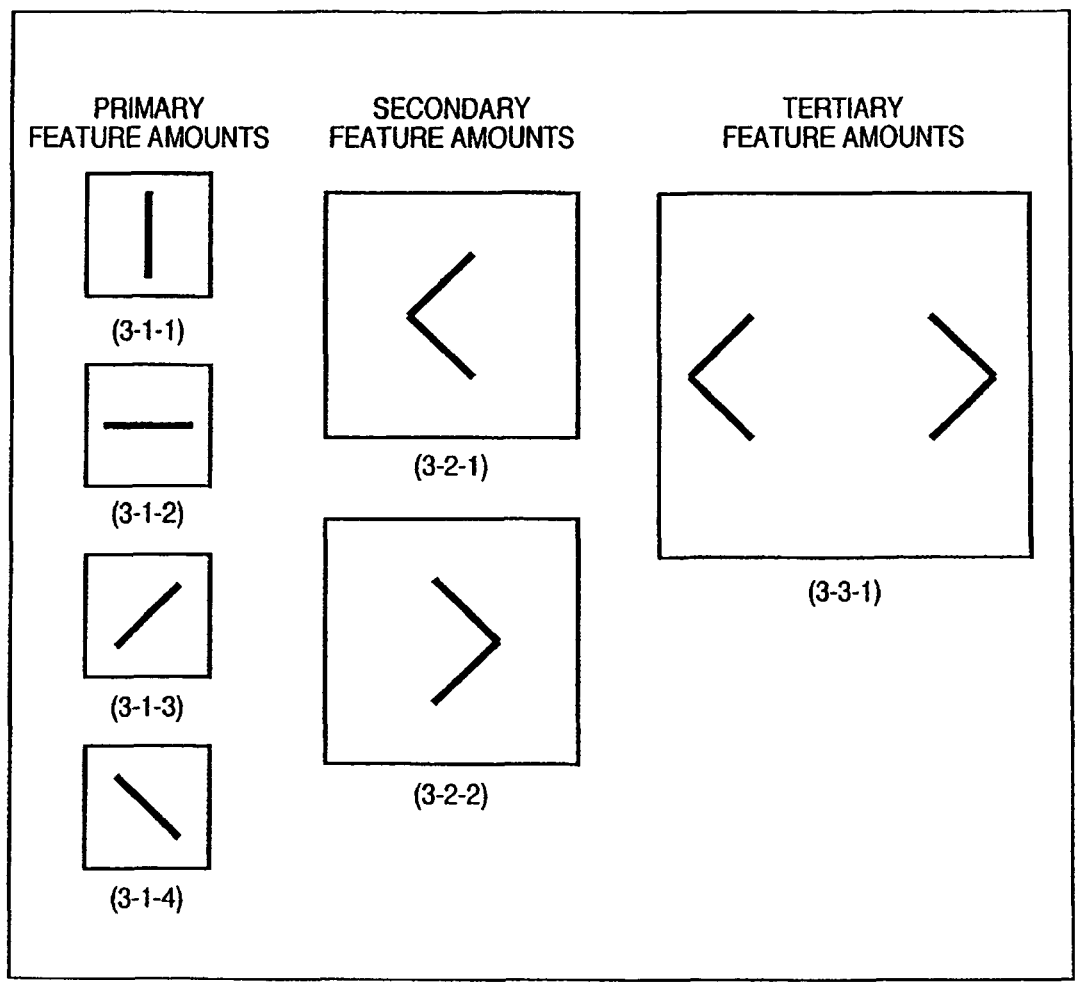
FIG. 3 is a view showing examples of a primary feature amount, a secondary feature amount and a tertiary feature amount of the eyes.

The primary feature amounts in the detection of eyes are the features of specific directions, including longitudinal (3-1-1), transverse (3-1-2), right upward (3-1-3) and right downward (3-1-4), as shown in FIG. 3. Accordingly, a process for detecting the features from the input image is made on the feature detection layer 102 (1,0). Therefore, a coupling constant between the data input layer 101 and the feature detection layer 102 is made so that the feature detection layer 102 (1,0) can detect those primary feature amounts from the input image on the data input layer 101. Since the constitution of such coupling constant is well known, its explanation is omitted here.

In this connection, the secondary feature amounts include right open V-character (3-2-1) and left open V-character (3-2-2), and the tertiary feature amounts include the eyes (3-3-1). FIG. 3 is a view showing the examples of the primary feature amount, the secondary feature amount and the tertiary feature amount of the eyes.

Herein, the operation of each neuron within one layer is performed in accordance with the following Formula (index indicating the kind of feature is omitted).

$$u^{(k)}(r') = \sum_{r \in C(r')} w^{(k)}(r'-r) y^{(k-1)}(r) \quad (1)$$

$$y^{(k)}(r') = f(u^{(k)}(r')) \quad (2)$$

Where $u^{(k)}(r)$ is an input sum of neuron corresponding to position vector r on hierarchy k, $w^{(k)}(r'-r)$ is a weight coefficient indicating the strength of coupling between the neuron corresponding to position vector r' on hierarchy k and the neuron corresponding to position vector r on hierarchy (k−1), and $y^{(k-1)}(r)$ is the output of neuron corresponding to position vector r on hierarchy (k−1).

Figure 4:
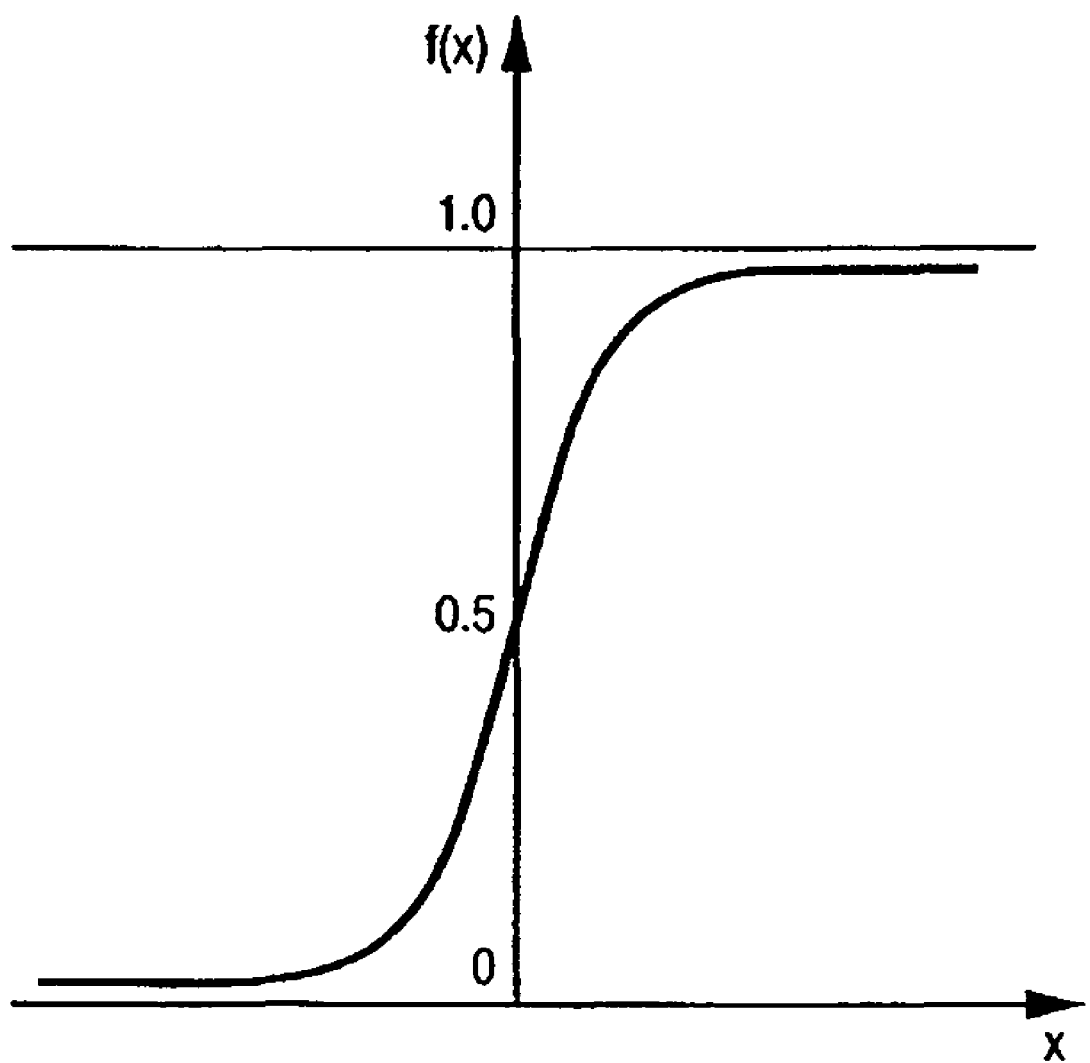
FIG. 4 is a graph showing the shape of a logistic function.

The input sum computed in accordance with the Formula (1) is transformed by a non-linear function f and outputted. Though various kinds of output function are provided, a logistic function in the following Formula $$f(x) = \frac{1}{1 + \exp(-ax)} \quad (3)$$

is employed here.

Where a is a positive constant. The logistic function has a shape as shown in FIG. 4, and normalizes the input sum into a real value from 0 to 1. That is, the output value of a neuron is limited with a range from 0 to 1.

The feature detection process will be described below in more detail.

First of all, the local data around a certain position of the image (this local area corresponds to a receptor field 105, and becomes $y^{(k-1)}(r)$ in the formula) is read, and a sum of products of the read data with the weight coefficient is calculated in accordance with the Formula (1) to obtain an input sum.

And the output value of a neuron is calculated from the input sum in accordance with the Formula (2). The neuron output obtained in this way is the output from the central point of the local area. This process occurs at each point of the input image by moving the local area. Thus, the feature detection process is performed all over the input image by moving the local area. Further, the integration process and the secondary and tertiary feature amount detection processes are performed over the entire input image in the same way.

At step S203, a process for integrating the primary feature amounts on the feature integration layer 103(2,0) is performed. A distribution of weight coefficients as used here is Gaussian, for example, whereby the output of the feature detection layer 102(1,0) is obscured spatially to permit a dislocation or deformation by making the integration process.

At step S204, the secondary feature amount detection is made on the feature detection layer 102(1,1). The secondary feature amounts here are the V-character patterns (3-2-1,3-2-2), as shown in FIG. 3, which are detected from mainly two oblique direction patterns (3-1-3,3-1-4) of the primary feature amounts within the receptor field and their positional relations. That is, the secondary feature amounts are detected by combining plural kinds of primary feature amounts.

Hence, the feature detection layer 102(1,1) calculates the input sum through the product sum operation in accordance with the formula (1) to which the weight coefficient for detecting the V-character is applied, employing the local data of the primary feature amounts integrated on the feature integration layer 103(2,0), in the same way as at step S202. Herein, the weight coefficient for detecting the V-character is the coupling coefficient between the feature detection layer 102(1,1) and the feature integration layer 103(2,0). Since the constitution of such coupling coefficient is well known, its explanation is omitted here. And the output value of a neuron is calculated from the input sum in accordance with the formula (2) to detect the secondary feature amounts.

Subsequently, at step S205, the secondary feature amounts are integrated on the feature integration layer 103(2,1). A distribution of weight coefficients as used here may be Gaussian, for example. By using the integration process, the output from the feature detection layer 102(1,1) is spatially obscured to permit a dislocation or deformation.

And at step S206, the tertiary feature amount is detected by the feature detection layer 102(1,2) that is the next layer of the feature integration layer 103(2,1). The tertiary feature amount here is the eyes (3-3-1), as shown in FIG. 3, and is detected from mainly two V-characters (3-2-1,3-2-2) of the secondary feature amounts within the receptor field and their positional relation. That is, the tertiary feature amount is detected by combining plural kinds of secondary feature amounts.

Hence, the feature detection layer 102(1,2) calculates the input sum through the product sum operation in accordance with the formula (1) to which the weight coefficient for detecting the eyes is applied, employing the local data of the secondary feature amounts integrated on the feature integration layer 103(2,1), in the same way as at step S202. Herein, the weight coefficient for detecting the eyes is the coupling coefficient between the feature detection layer 102(1,2) and the feature integration layer 103(2,1). Since the constitution of such coupling coefficient is well known, its explanation is omitted here. And the output value of a neuron is calculated from the input sum in accordance with the formula (2) to detect the tertiary feature amount.

Subsequently, at S207, the tertiary feature amount is integrated on the feature integration layer 103(2,2) that is the next layer of the feature detection layer 102(1,2). A distribution of weight coefficients as used here may be Gaussian, for example. By using the integration process, the output from the feature detection layer 102(1,2) is spatially obscured to permit a dislocation or deformation.

And the result of integrating the tertiary feature amount is the final result of detecting the eyes. Instead of performing the step S207, the result detected at step S206 may be the result of detecting the eyes. In the above explanation, it is unnecessary that the primary to tertiary features are limited to the local features as shown in FIG. 3.

As described above, the low order features are detected from the input image, the middle order features are detected based on them, and then the high order feature is detected, whereby the hierarchical processes are effected to perform pattern recognition. These processes may be easily performed in parallel to detect plural features. When these processes are implemented by hardware, a step of once saving the processing result (detection result or integration result) on one layer in a memory and reading data from the memory in performing the processing on the next layer is repeated.

Figure 5:
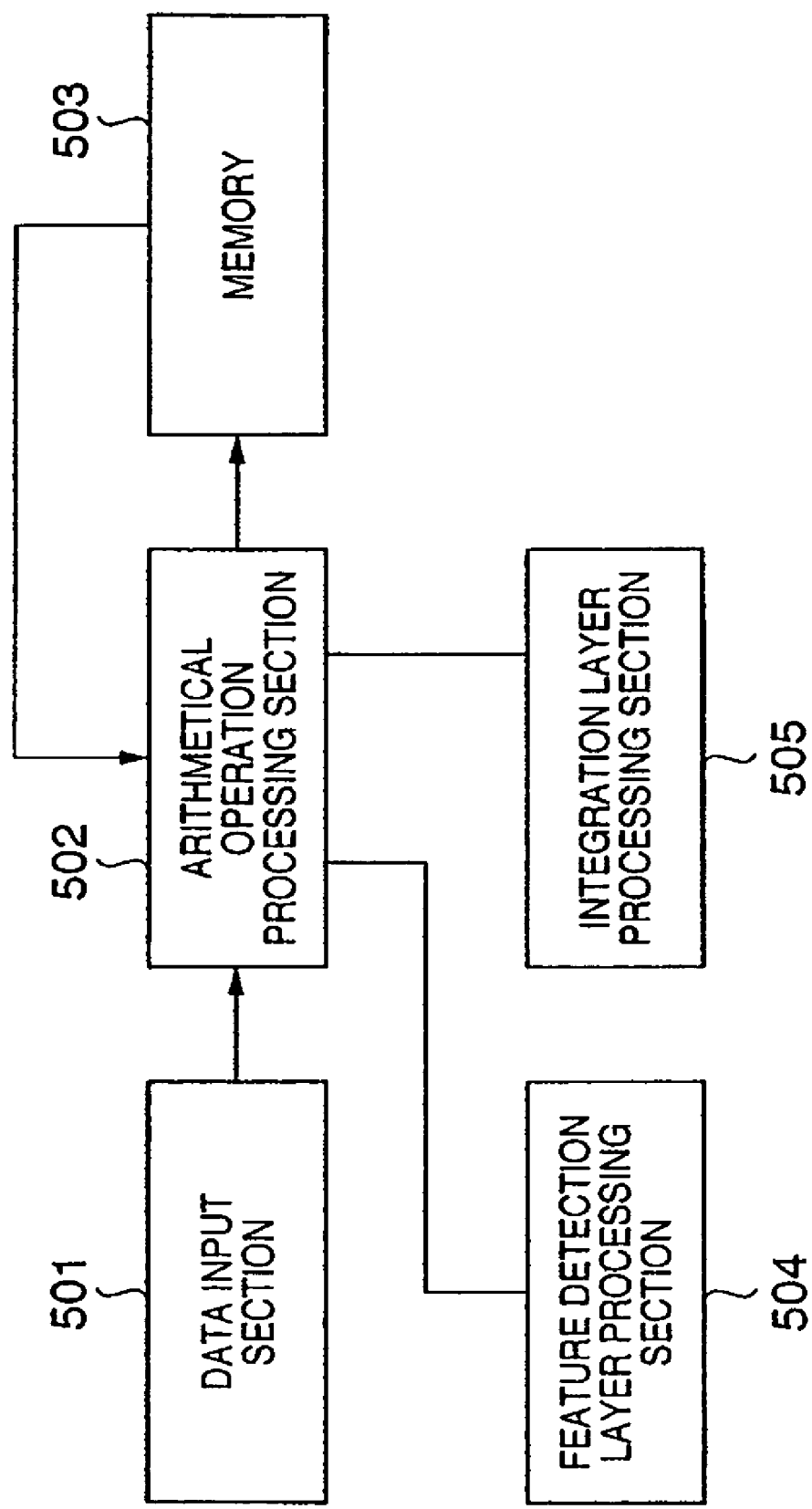
FIG. 5 is a block diagram showing a functional configuration of hardware to implement a process for making the pattern recognition by performing the hierarchical process of detecting a low order feature from an input image, detecting a middle order feature based on it, and detecting a high order feature.

FIG. 5 is a diagram showing a functional configuration of hardware when the above processes are performed by hardware. It is supposed that the weight coefficient data for detection of primary feature amounts, the weight coefficient data for detection of secondary feature amounts and the weight coefficient data for detection of tertiary feature amount are held in a memory 503 and read, as needed.

The data of the input image is inputted via a data input section 501 into an arithmetical operation processing section 502. The arithmetical operation processing section 502 firstly controls a feature detection layer processing section 504 to perform a feature detection layer process (on the feature detection layer 102(1,0)) and perform the processing at step S202 to perform the primary feature amount detection process. This primary feature amount detection process corresponds to the process for computing the output value of each neuron making up the feature detection layer 102(1,0) in FIG. 1. In performing the primary feature amount detection process, the data of weight coefficients for detection of the primary feature amounts is read from the memory 503. And the data of the output value of each neuron thus obtained is once stored in the memory 503.

Subsequently, the arithmetical operation processing section 502 controls an integration layer processing section 505 for performing a feature integration layer process (on the feature integration layer 103(2,0)) to perform the processing at step S203 to perform the primary feature integration process. More particularly, first of all, the local data (data of the output value of each neuron) of the primary feature amounts stored in advance is read from the memory 503, and controls the integration layer processing section 505 to perform the integration process at step S203 based on the read data. And the integration process result thus obtained (corresponding to the output value of each neuron making up the feature integration layer 103(2,0) in FIG. 1) is stored in the memory 503. Similarly, the data of the output value of each neuron making up the layer at the former stage is read from the memory 503 to perform the feature amount detection process and the integration process alternately. At this time, either the feature detection layer processing section 504 or the integration layer processing section 505 is controlled. In computing the output value of neuron, the data of weight coefficients for detection of secondary feature amounts and data of weight coefficients for detection of a tertiary feature amount are read from the memory 503.

In the above way, the process is performed by hardware in accordance with the flowchart as shown in FIG. 2.

In the above process, when the input image is larger, or the features to be detected are more complex, which increases a required number of hierarchies, the computation amount and the holding memory amount are increased. Thus, a process is performed in which when the output value of neuron obtained by detecting the features is less than or equal to a threshold (e.g., 0.4), the output value of the neuron or internal state value (product sum operation result) is not stored in the memory (when the internal state value is stored, it is read as the value converted by the function f). This processing method is called a pruning of a neuron, which is made by a pruning module 107 as shown in FIG. 1.

In detecting the features on a certain hierarchy, the output value of a neuron on the previous hierarchy is read from the memory, in which if all the output values of neurons in the local area (hereinafter referred to as a receptor field) on the previous hierarchy, with which the neurons on that hierarchy are coupled, are not stored in the memory, the feature detection result at the central point is not computed and naturally, the processing result is not stored in the memory. Also, when several output values of neurons in the receptor field are not held in the memory, the product sum operation with the weight coefficient is made, employing a constant (e.g., 0.1), instead of the output value of neuron not held, to perform the detection process.

In the following, when the pruning is made, one series of steps in the process as shown in FIG. 2 will be described.

Figure 6:
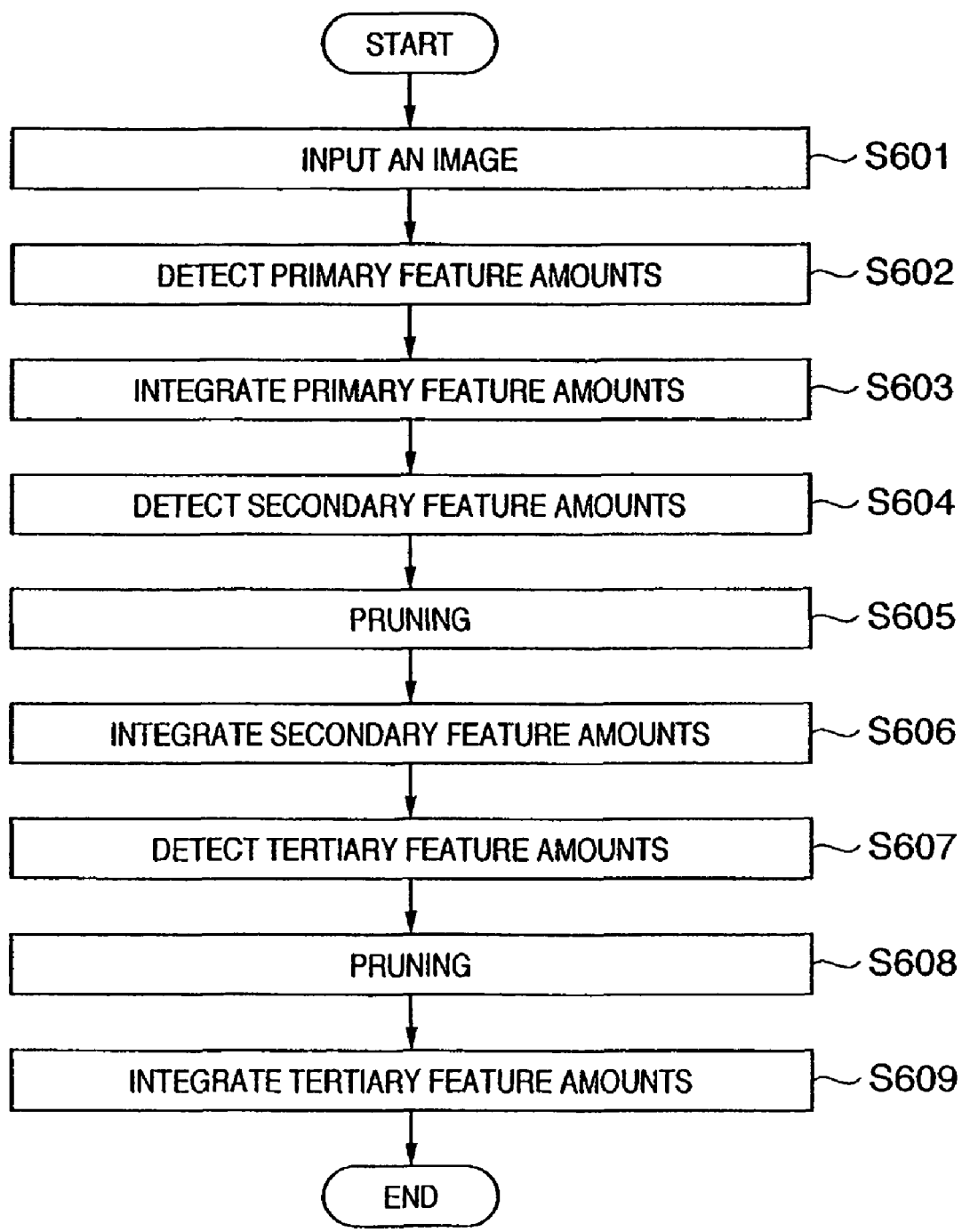
FIG. 6 is a flowchart of a pruning process in the process as shown in FIG. 2.

FIG. 6 is a flowchart showing the operation including the pruning in the process as shown in FIG. 2. In FIG. 6, the pruning is made at the time of detecting the secondary features. Hence, the processing at each of steps S601 to S604 in the primary feature detection process is the same as at each of steps S201 to S204, as previously described, and the explanation of these steps is omitted.

Since the output value of each neuron making up the feature detection layer 102(1,1) is obtained through the processing at steps S601 to S604, it is stored in the memory to make the processing on the layer at the latter stage, in which at step S605, the pruning for the output values of neurons is made. That is, if the output value of a neuron obtained by feature detection at step S604 is less than or equal to a threshold (e.g., 0.4), a storage control process in which the output value of its neuron or internal state value (product sum operation result) is omitted or not stored in the memory is performed.

Subsequently, at step S606, a processing for integrating the secondary feature amounts is made in the same way as at step S205. At this time, since the output value of each neuron making up the layer at the former stage (feature detection layer 102(1,1)) is employed, the data stored in the memory at step S605 is read, in which instead of the output value of neuron not stored in the memory at step S605, 0 is read. Also, the secondary feature amount integration result may not be stored in the memory when the output value of a neuron is 0.

At step S607, a tertiary feature amount detection process is made in the same way as at step S206. At this time, since the output value of each neuron making up the layer at the former stage (feature integration layer 103(2,1)) is employed, the data stored in the memory at step S605 is read, in which if all the output values of neurons in the receptor field are not stored in the memory at step S605, the output value of each neuron making up the feature detection layer 102(1,2) is not performed, but the neuron is to be omitted by the pruning for the tertiary feature amount detection result at the next step S608.

Also, at step S607, when several output values of neurons in the receptor field are not held in the memory, the product sum operation with the weight coefficient is made, employing a constant (e.g., 0.1), instead of the output value of a neuron not held, to perform the detection process.

And at step S608, the pruning for the output values of these neurons is made. That is, if the output value of neuron obtained by feature detection at step S607 is less than or equal to a threshold (e.g., 0.4), the storage control process in which the output value of a neuron or internal state value (product sum operation result) is omitted or not stored in the memory is performed.

Subsequently, at step S609, a processing for integrating the tertiary feature amount is made in the same way as at step S207. At this time, since the output value of each neuron making up the layer at the former stage (feature detection layer 102(1,1)) is employed, the data stored in the memory at step S608 is read, in which instead of the output value of a neuron not stored in the memory at step S608, 0 is read. Also, the tertiary feature amount integration result may not be stored in the memory when the output value of a neuron is 0.

And the result of integrating the tertiary feature amount is outputted as the final result of detecting the eyes. Instead of performing the step S609, the result stored in the memory at step S608 may be the result of detecting the eyes. In the above explanation, it is unnecessary that the primary to tertiary features are limited to the local features as shown in FIG. 3.

Referring to a flowchart of FIG. 7, the process on the feature detection layer after the pruning process of neuron will be described below in detail.

First of all, at step S701, the neuron to calculate the output value is decided. Subsequently, at step S702, the output value of neuron in the receptor field on the previous hierarchy, with which the neuron decided at step S701 is coupled, is read from the memory.

And at step S703, it is determined whether or not all the read output values of neurons within the receptor field are subjected to pruning. If all the neurons are pruned, the data of this output value is naturally not provided and held in the memory without making the process for computing the output value of neuron specified at step S701. And the procedure returns to step S701, where the neuron for which the output value is not yet calculated is decided, and the same operation is performed.

On the other hand, if at step S703, all the neurons are not subjected to pruning, the procedure goes to step S704, where a preset value that is not zero is substituted for the output of the pruned neuron. And the weight coefficient data for detection of features is read at step S705, and the output value of neuron decided at step S701 is calculated based on the formulas (1) and (2) at step S706.

And at step S707, the output value of neuron calculated at step S706 is subjected to pruning. That is, if the output value of this neuron is greater than or equal to a predetermined threshold, the output value of neuron, with the address of neuron, is stored in the memory, or if the output value of this neuron is less than the predetermined threshold, no process for storing data in the memory is performed, and the procedure goes back to step S701. And the neuron for which the output value is not yet calculated is decided, and the same operation is performed.

Figure 8:
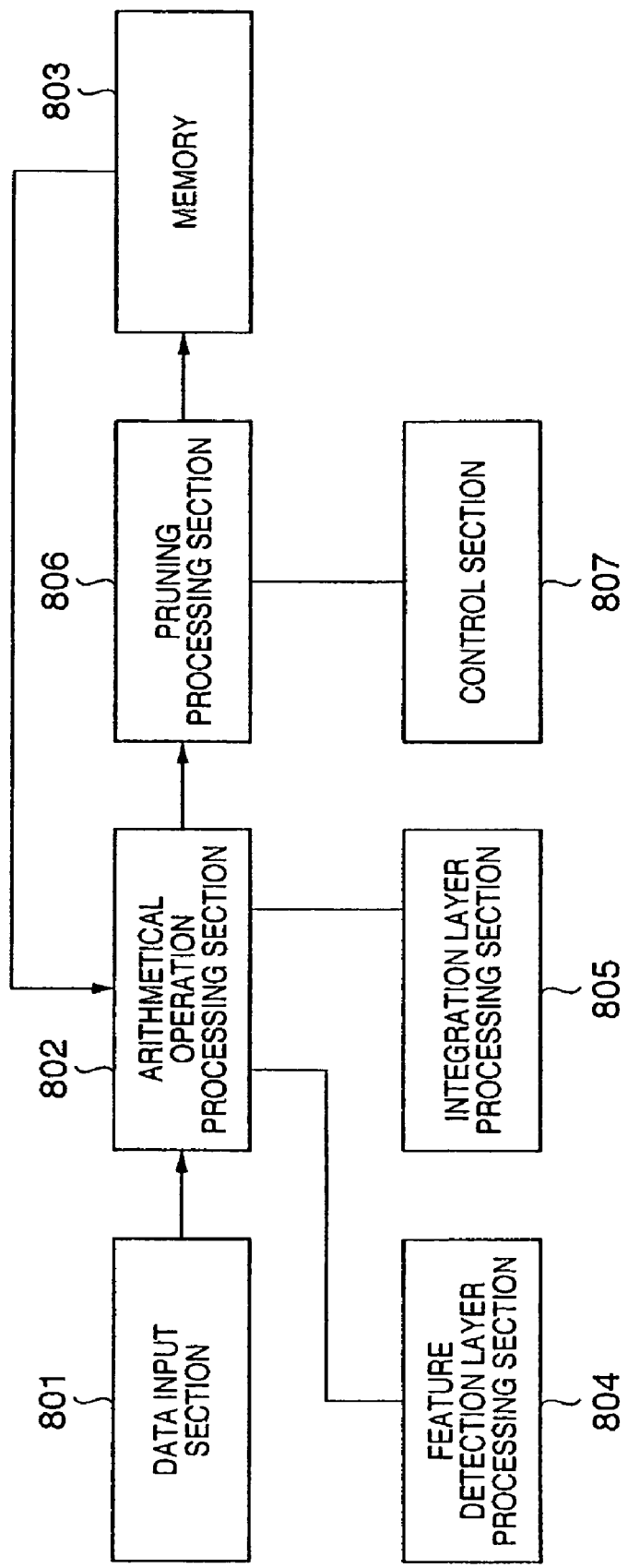
FIG. 8 is a block diagram showing a functional configuration of hardware to make one series of process according to the first embodiment of the invention.

FIG. 8 is a block diagram showing a functional configuration of hardware when the above procedure is implemented by hardware. It is supposed that the weight coefficient data for detection of primary feature amounts, the weight coefficient data for detection of secondary feature amounts and the weight coefficient data for detection of tertiary feature amount are held in a memory 803 and read, as needed.

The data of the input image is inputted via a data input section 801 into an arithmetical operation processing section 802. The arithmetical operation processing section 802 firstly controls a feature detection layer processing section 804 to make a feature detection layer process (on the feature detection layer 102(1,0)) and perform the processing at step S602 to make the primary feature detection process. This primary feature detection process corresponds to the process for computing the output value of each neuron making up the feature detection layer 102(1,0) in FIG. 1. In making the primary feature amount detection process, the data of weight coefficients for detection of the primary feature amounts is read from the memory 803. And the data of the output value of each neuron thus obtained is once stored in the memory 803.

Subsequently, the arithmetical operation processing section 802 controls an integration layer processing section 805 for performing the feature integration layer process (on the feature integration layer 103(2,0)) to perform the processing at step S603 and effect the primary feature integration process. More particularly, first of all, the local data (data of the output value of each neuron) of primary feature amounts stored in advance is read from the memory 803, and controls the integration layer processing section 805 to perform the integration process at step S603 based on the read data. And the result of the integration process thus obtained (corresponding to the output value of each neuron making up the feature integration layer 103(2,0) in FIG. 1) is stored in the memory 803. In making the storage, a pruning processing section 806 performs the pruning at the step S605.

That is, the pruning processing section 806 compares the output value of a neuron obtained by making the feature detection at step S604 and a threshold (e.g., 0.4), in which if the output value is less than or equal to the threshold, the storage control process in which the output value of its neuron or internal state value (product sum operation result) is omitted or not stored in the memory 803 is performed.

Similarly, the data of the output value of each neuron making up the layer at the former stage is read from the memory 803 to perform the feature amount detection process and the integration process alternately. At this time, either the feature detection layer processing section 804 or the integration layer processing section 805 is controlled. In computing the output value of a neuron, the data of weight coefficient for detection of secondary feature amounts and data of weight coefficient for detection of tertiary feature amounts are read from the memory 803.

Also, when the data is stored in the memory 803, the output value and the threshold are compared, in which if the output value is less than or equal to the threshold, this output value, or the internal state value of neuron having this output value, is not stored in the memory 803.

In the above way, the process is performed by hardware in accordance with the flowchart as shown in FIG. 6.

By performing the pruning process of a neuron in the above way, the operation processing amount and the amount of memory used are greatly reduced. For example, when an image containing a complex background (in which there are many V-character patterns) behind the figure image is employed as the input image, as shown in FIG. 1, about 70% of the neuron outputs have a value of 0.4 or less in a distribution of output values as the V-character pattern detection result. That is, the amount of memory used is reduced by about 70%.

Moreover, since the output value of neuron less than or equal to 0.4 is not employed in the ensuing process, there is no influence of the feature or noise that is at low detection level and not remarkable. Therefore, there is the advantage that the feature detection process on the next hierarchy is facilitated. For example, there is the advantage that the learning of weight coefficients for detection is converged fast at fewer supervisor points. In this embodiment, the reference value is 0.4, but the optimal value may be decided depending on the recognition object.

Also, in selecting the teacher points, there is the advantage that, it is easier to select the supervisor points efficient for the learning, if the pruning is made. The weight coefficient thus obtained is excellent in the universal performance.

Comparing a case (a) where the learning was made without pruning and a case (b) where the learning was made with pruning, when the same supervisor points were given, the learning convergence was four times faster in (b), and the detection result with the learned weight coefficient had less false detection.

In view of the universality, in (a) the features to be detected are detected correctly but the false detection level may be often high, whereas in (b) the features to be detected are detected correctly and the false detection level is suppressed lower than the correct detection level, whereby the universal performance is more excellent.

As described above, with the present invention, in the pattern recognition employing the hierarchical neural network, if the output value of neuron is less than or equal to a threshold, the output value of this neuron is broken and not stored in the memory, whereby the amount of memory used is reduced in the operation of neural network.

Also, when the output value of a neuron on the feature detection layer is computed, the process for computing this output value is omitted if the data to be referred to is not held in the memory, whereby the operation of neural network is performed faster. Naturally, since the output value of this neuron is not computed and not held in the memory, it is subjected to the pruning, whereby the use amount of memory is reduced.

Moreover, by omitting the output value of a neuron less than or equal to a threshold, there is the effect that the weight coefficient is learned at high speed, and the pattern recognition has excellent universality.

Second Embodiment

Though the recognition (detection) process using the neural network is implemented by dedicated hardware as described in the first embodiment, a program may be installed into a computer such as a general-purpose PC (personal computer) or WS (workstation) and executed by a CPU of the computer.

Figure 12:
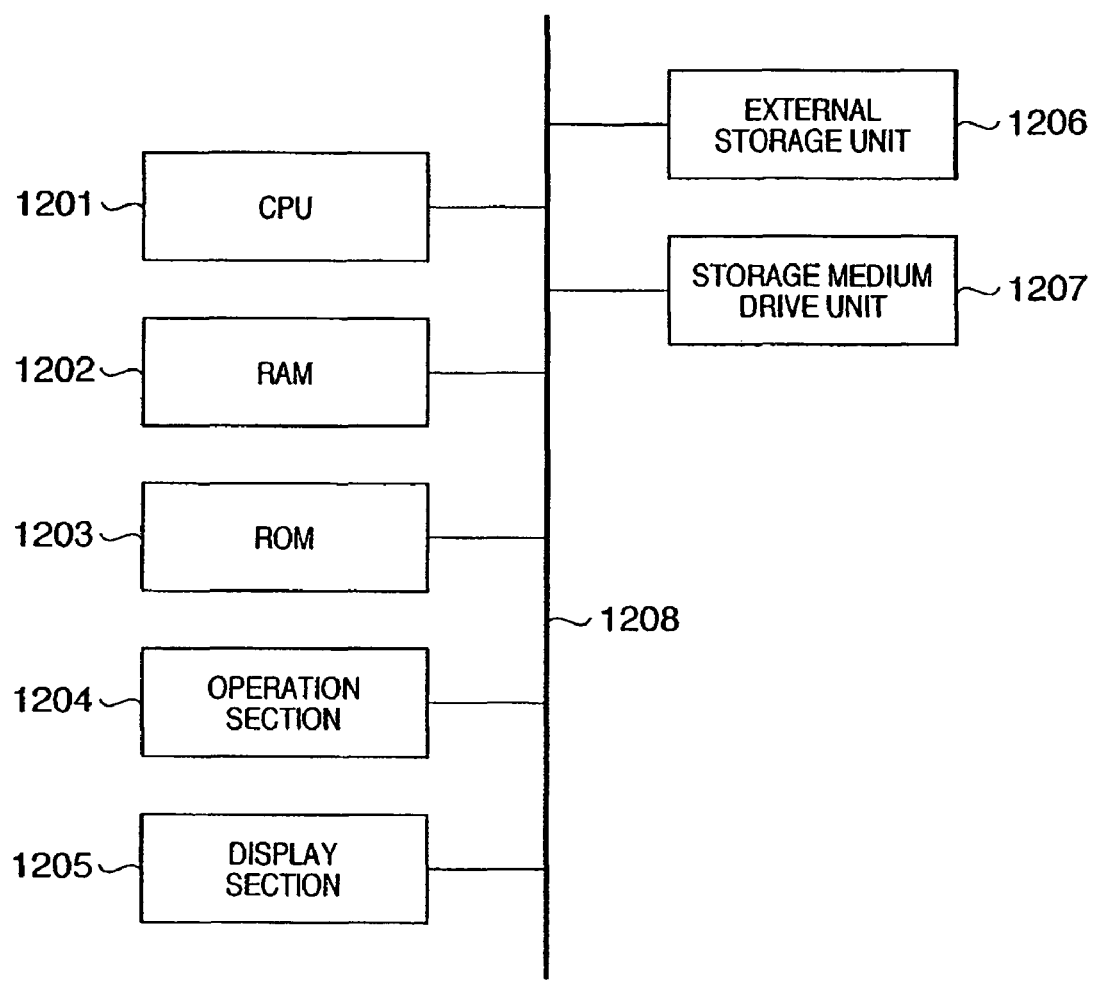
FIG. 12 is a diagram showing the basic configuration of a computer according to the second embodiment of the invention.

FIG. 12 is a diagram showing a basic configuration of this computer.

Reference numeral 1201 designates a CPU that controls the overall computer employing the program or data stored in a RAM 1202 or a ROM 1203 and performs the processes as described in the first embodiment.

Reference numeral 1202 designates a RAM that comprises an area for temporarily storing the program or data loaded from an external storage unit 1206 or a storage medium drive unit 1207, and a work area used by the CPU 1201 to perform each process.

Reference numeral 1203 designates a ROM that stores a boot program and various kinds of setting data for the computer.

Reference numeral 1204 designates an operation unit that is composed of a keyboard and a mouse used to input various kinds of instruction into the CPU 1201.

Reference numeral 1205 designates a display unit that is composed of a CRT or a liquid crystal screen to display the processing result of the CPU 1201 in the image or characters.

Figure 7:
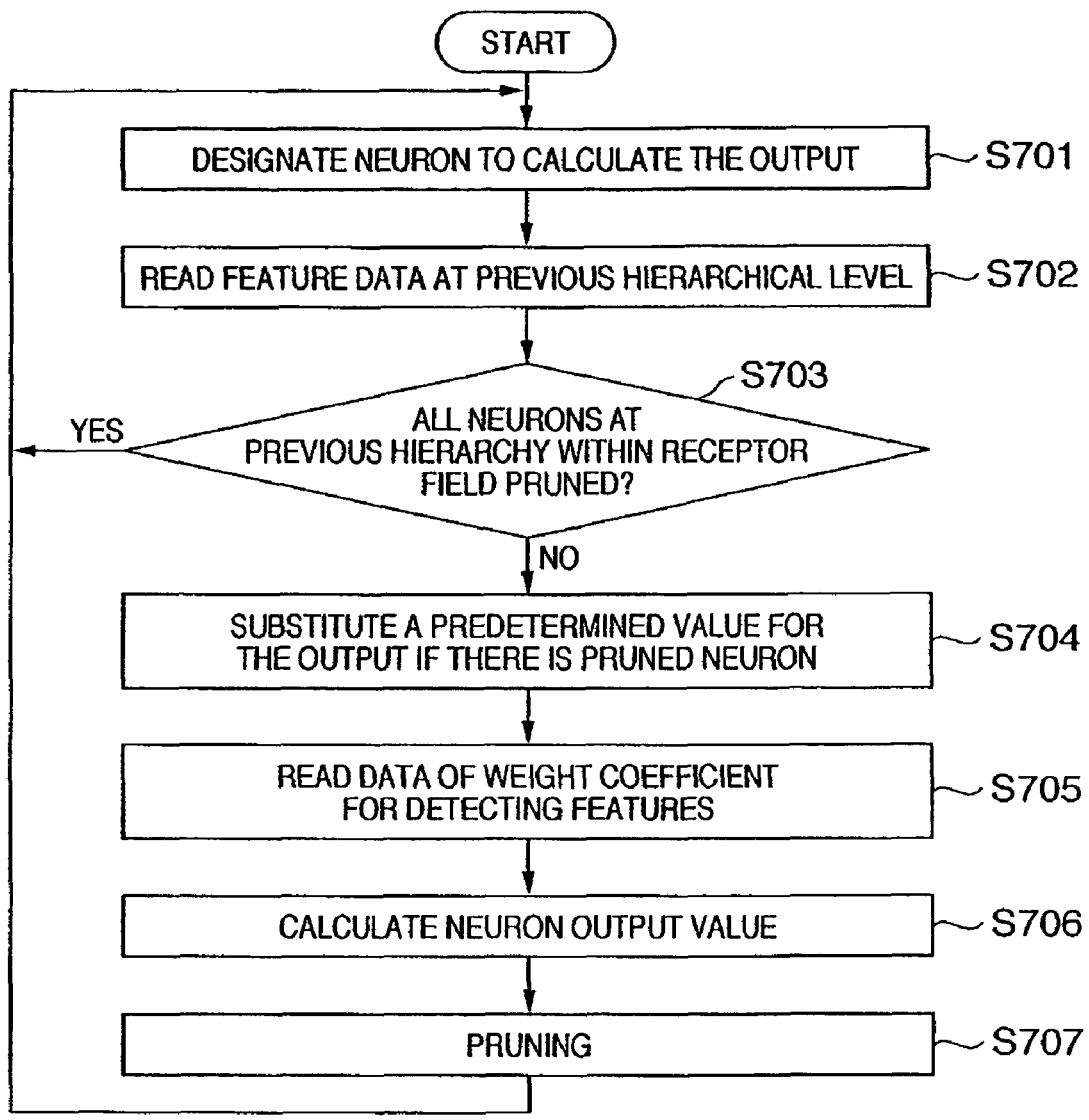
FIG. 7 is a flowchart showing a process of feature detection layer after performing the pruning process of neuron.

Reference numeral 1206 designates an external storage unit that is composed of a mass storage unit such as a hard disk drive unit that stores an OS (operating system), the data of weight coefficient for detection of primary feature amounts, data of weight coefficient for detection of secondary feature amounts, data of weight coefficient for detection of tertiary feature amount, data of the input image, and the programs for enabling the CPU 1201 to perform the operation of the neural network (programs for enabling the CPU 1201 to perform the processes in accordance with the flowcharts of FIGS. 6 and 7), part or all of which is loaded into the RAM 1201 under the control of the CPU 1201.

Reference numeral 1207 designates a storage medium drive unit that reads the program or data recorded on a recording medium such as CD-ROM or DVD-ROM, and outputs it to the RAM 1202 or the external storage unit 1206. Part or all of the program or data stored in the external storage unit 1206 as described above may be recorded on the storage medium, and read and loaded from the storage medium into the RAM 1202 by the storage medium drive unit 1207, as needed.

Reference numeral 1208 designates a bus connecting the above units.

A process for detecting a predetermined pattern in the input image on this computer as described in the first embodiment will be described below.

If the operator of the computer inputs a command for loading a neural network program (program for enabling the CPU 1201 to perform the process in accordance with the flowcharts of FIGS. 6 and 7) into the RAM 1202, employing the keyboard or mouse included in the operation unit 1204, the CPU 1201 detects the command, and controls the external storage unit 1206 or the storage medium drive unit 1207 to load the program or data into the RAM 1202.

Next, the CPU 1201 reads the candidate data of the input image from the external storage unit 1206 or the storage medium and displays a list of data on the display unit 1205 to prompt the operator to select an item.

If the operator specifies an item employing the keyboard or mouse included in the operation unit 1204, the CPU 1201 detects this item and executes the neural network program for a specified image as the input image to be processed by the neural network program.

And the recognition result (detection result) is displayed on the display unit 1205.

In this way, one series of process as described in the first embodiment can be performed employing the computer. The method for implementing the series of process as described in the first embodiment is not limited thereto, but various other methods may be conceived.

Third Embodiment

In this third embodiment, a learning method for learning the weight coefficient employing the result of pruning the neuron will be described below. Herein, the learning of weight coefficient is made for each module, or for each hierarchy, employing a generalized delta method.

Figure 9:
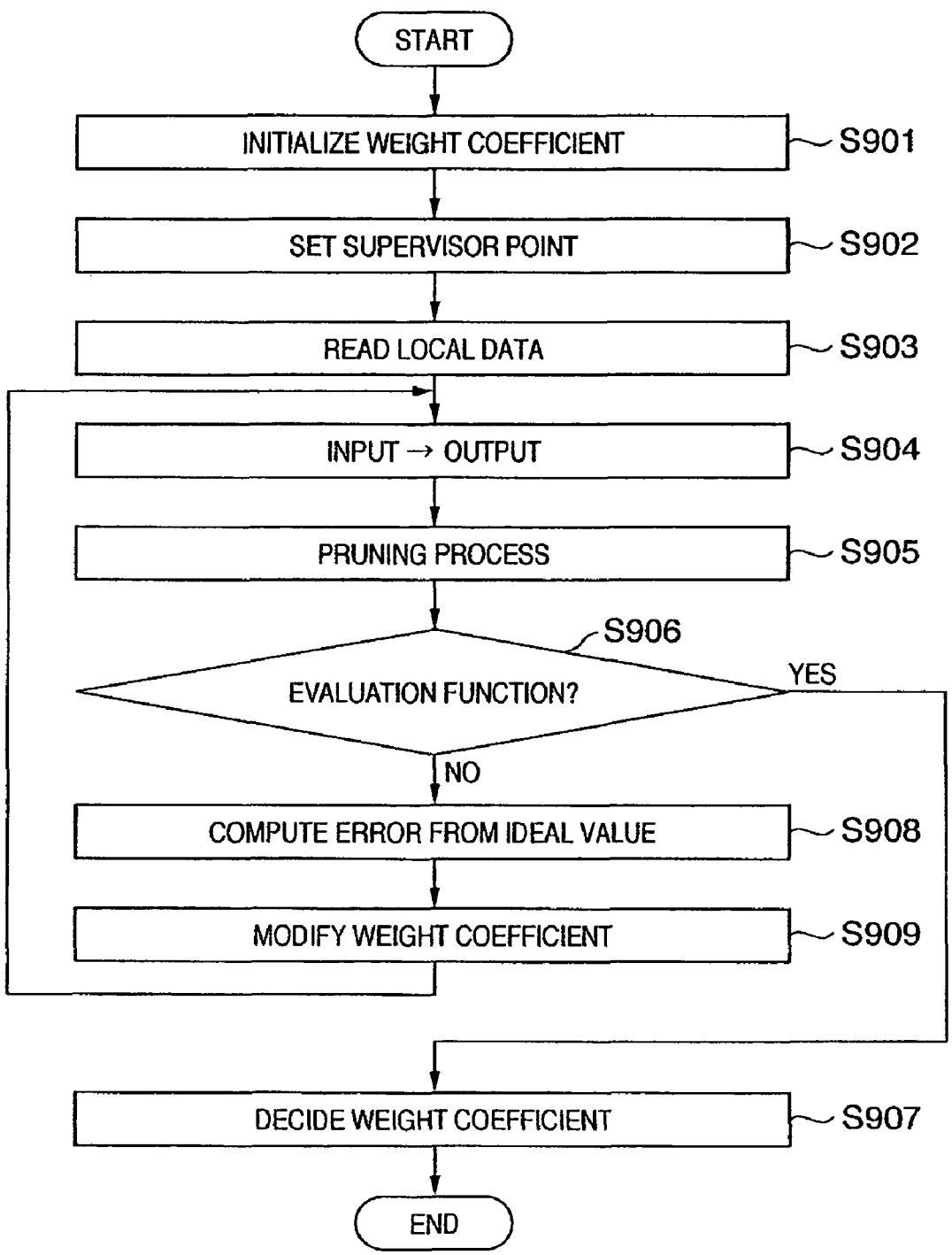
FIG. 9 is a flowchart showing a learning process of weight coefficient according to a third embodiment of the invention.

FIG. 9 is a flowchart showing a process for learning the weight coefficient in this embodiment. The process in accordance with the flowchart as shown in FIG. 9 may be performed by a dedicated hardware, but in this embodiment, is performed by storing a program for enabling the CPU 1201 to make the process in accordance with the flowchart as shown in FIG. 9 in the external storage unit 1206 or the storage medium, and loading the program into the RAM 1202 to enable the CPU 1201 to execute the program. It is supposed that all the data required for the following process is stored in the external storage unit 1206 or the storage medium and loaded into the RAM 1202 under the control of the CPU 1201.

First of all, at step S901, the hierarchy for learning is decided, and the initialized weight coefficient is set up. This initialization process is unnecessary when the existent weight coefficient is further learned. The layer for learning may be decided by the operator of the computer, employing the operation unit 1204, or by the CPU 1201.

Subsequently, at step S902, the supervisor point for learning is selected, and the ideal value is set up (more than one value may be selected). The ideal value is 1 at the supervisor point of right answer, or 0 at the supervisor point of wrong answer. At step S903, the output value of neuron corresponding to the supervisor point set at step S902 and the output value of neuron in the receptor field on the former hierarchy coupled with the neuron are read from the memory (RAM 1202).

Subsequently, at step S904, the output value of neuron is obtained from the data read at step S903 in the local area corresponding to the supervisor point set at step S902 in accordance with the formulas (1) to (3), employing the initialized weight coefficient (or weight coefficient to be learned). At step S904, the value of neuron on the input side after pruning is employed, and a non-zero constant (e.g., 0.1) is substituted for the output value of neuron that is omitted.

And at step S905, the obtained output value of neuron is subjected to pruning. That is, if the output value of neuron is less than or equal to a threshold (e.g., 0.4), 0 is stored in the memory (RAM 1202). Naturally, the output value of neuron is greater than or equal to the threshold (e.g., 0.4), the same value is stored in the memory as in the first embodiment.

First of all, before entering a modification process for weight coefficient, an evaluation function is examined at step S906. If the evaluation function satisfies the following formulas, $$E_j = \frac{1}{2}(r_j - y_j)^2 \quad (4)$$

$$E = \sum_j E_j < d \quad (5)$$

the learning is ended. Where j is the serial number of supervisor point, $r_j$ is the ideal output value, and $y_j$ is the output value of neuron calculated with the current weight coefficient. Also, d is a threshold for determining the end of learning, e.g., {0.01×(number of supervisor points)}. If the formula (5) is satisfied, the procedure goes to step S907, or otherwise, the modification of weight coefficient is made at the next step.

At step S908, an error $\delta_j$ between the output value of neuron at the supervisor point and the ideal value is computed in accordance with the following formula.

$$\delta_j = (r_j - y_j) f'(u_j) \quad (6)$$

At step S909, the weight coefficient is modified in accordance with the following formulas.

$$w_i(t+1) = w_i(t) + \Delta w_i(t) \quad (7)$$

$$\Delta w_i(t) = \eta \delta_j y_i + \alpha \Delta w_i(t-1) \quad (8)$$

Where $\eta$ is a learning rate and $\alpha$ is an inertia term. The parameters $\eta$ and $\alpha$ govern the converging speed of learning, in which if they are set too high, the error value is fluctuated to be less preferable for learning. If the parameters $\eta$ and $\alpha$ are set within a range from 0.1 to 1.0, the learning is excellent. Also, the learning is more excellent if $\eta$ is varied depending on the modification value $\Delta w$ of the weight coefficient.

After modifying the weight coefficient, the procedure returns to step S904 to compute again the output value of neuron at the supervisor point and examine the evaluation function. The learning is progressed by repeating the above steps.

By performing the above process, the weight coefficient is learned. As a result, the learning is converged fast at less supervisor points than without pruning, as described in the first embodiment. Also, the weight coefficient thus obtained has excellent universal performance.

It is advantageous for the learning of weight coefficient that the non-zero value, e.g., 0.1, is substituted for the neuron after pruning. The modification of weight coefficient is made in accordance with the formula (8), but if $y_i = 0$, the weight coefficient is not modified, and the learning is not progressed. Thus, the non-zero value, e.g., 0.1, which is closer to zero (than the output value 1 of right answer), is substituted. The first term on the right side of the formula (8) has the non-zero value, whereby the modification of the weight coefficient is made. This means that no prescribed features are not found can be learned. Consequently, the learning process is more efficient.

Fourth Embodiment

This embodiment is concerned with an image pickup device mounting the hardware for pattern recognition (detection) as described in the first embodiment.

Figure 10:
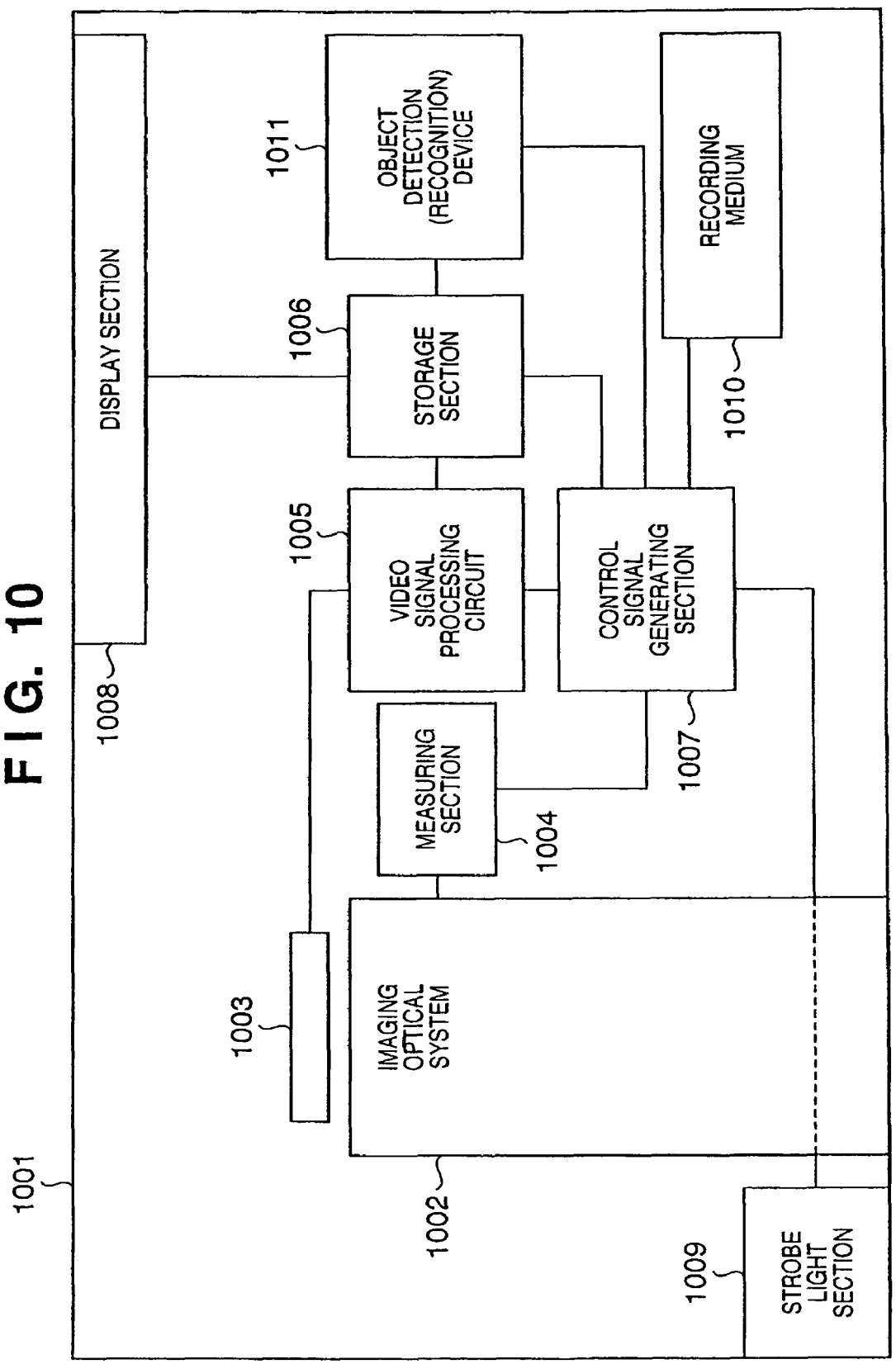
FIG. 10 is a block diagram showing the basic configuration of an image pickup device according to a fourth embodiment of the invention.

FIG. 10 is a block diagram showing a basic configuration of the image pickup device according to this embodiment.

In FIG. 10, the image pickup device can make the focusing on a specific subject, color correction of the specific subject, and exposure control. The image pickup device 1001 of FIG. 10 comprises an image forming optical system 1002 containing a photographing lens and a drive control mechanism for zoom photographing, a CCD or CMOS image sensor 1003, an image pickup parameter measuring section 1004, a video signal processing circuit 1005, a storage section 1006, a control signal generating section 1007 for generating a control signal for the control of image pickup operation or image pickup condition, a display section 1008 that is also used as a finder such as EVF, a strobe light section 1009, a recording medium 1010, and further comprises a subject detection (recognition) unit 1011 as the pattern recognition device.

In this image pickup device 1001, the subject detection (recognition) device 1011 detects a face image (existent position and size) of the figure from the photographed video. And if the position and size information of the figure is entered from the subject detection (recognition) device 1011 into the control signal generating section 1007, the control signal generating section 1007 generates a control signal for optimizing the focus control, exposure condition control and white balance control for the figure, based on the output from the image pickup parameter measuring section 1004.

Employing the pattern detection (recognition) device for the image pickup device, the optimal control for detecting the figure and photographing based on it can be made. And the required amount of memory is smaller than before, giving rise to the effect that the small and low consumption power unit is realized. Though in the above explanation the image pickup device 1001 comprises the pattern detection device as the subject detection (recognition) unit 1011, it is naturally possible that the image pickup device 1001 is mounted as processing means for implementing an algorithm of the pattern detection device as a program that is executed on the CPU.

Though in this embodiment the process for acquiring the face area from the input image with the face pattern as the detection pattern has been described, this embodiment is not limited to the face detection process.

Moreover, such image pickup device may be applied as image pickup unit for a monitor camera or a robot.

Other Embodiment

An object of the present invention may be also attained by supplying a recording medium (or storage medium) recording the software or program code for implementing the functions of the above embodiments to the system or device, and enabling the computer (or CPU or MPU) of the system or apparatus to read and execute the program code stored in the recording medium. In this case, the program code itself read from the recording medium realizes the functions of the above embodiments, and the recording medium recording the program code constitutes the present invention.

Also, the program code read by the computer may be executed to implement the functions of the above embodiments, and an operating system (OS) operating on the computer performs part or all of the actual processes based on instructions of the program code, thereby implementing the functions of the above embodiments.

Moreover, needless to say, after the program code read from the recording medium may be written into a memory provided in a function extension card inserted into the computer or a function extension unit connected to the computer, the CPU provided in the function extension card or the function extension unit may perform part or all of the actual processes, based on instructions of the program code, thereby implementing the functions of the above embodiments.

When this invention is applied to the recording medium, the recording medium stores the program code corresponding to the flowchart (function configuration) as described above.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-166136 filed on Jun. 3, 2004, the entire contents of which are hereby incorporated by reference herein.

The invention claimed is:

1. An information processing apparatus for detecting a predetermined pattern in an input image, comprising:
a hierarchical neural network having an input layer for inputting data and having a plurality of detection layers and integration layers arranged alternatively, wherein (i) a first detection layer is configured to detect and output one or more feature amounts from the data input to the input layer, (ii) each detection layer except for the first detection layer is configured to detect and output one or more feature amounts from the output of the integration layer at the former stage, and (iii) each integration layer is configured to integrate the outputted features from the detection layer at the former stage and output the result of integration;
an operation processing section that controls the plurality of detection layers and integrations layers to sequentially set each layer to be the current layer, compute an input sum for a neuron in the current layer using an output value of a neuron within a former layer that precedes the current layer and a weight coefficient between the current layer and the former layer, and compute an output value for the neuron in the current layer based on the input sum; and
a storage control unit that stores data of output values that are greater than or equal to a predetermined value in a memory, by comparing the output value of each neuron within a detection layer computed by said operation processing section to the predetermined value,
wherein said operation processing section performs control to store data of the output value of each neuron within an integration layer computed by said operation processing section in the memory,
wherein said operation processing section performs control to obtain the data of the output value of a neuron within the former layer that precedes the current layer by reading the data of the output value from the memory and performs control so that data having a predetermined non-zero value is used instead of the data of the output value of a neuron that is not stored in the memory,
wherein the input sum for a neuron is computed based on the formula:

$$u^{(k)}(r') = \sum_{r \in C(r')} w^{(k)}(r' - r) y^{(k-1)}(r)$$

where $u^{(k)}(r')$ is the input sum of a neuron corresponding to position vector r on hierarchy k, $w^{(k)}(r'-r)$ is a weight coefficient indicating the strength of coupling between the neuron corresponding to position vector r' on hierarchy k and the neuron corresponding to position vector r on hierarchy (k−1), and $y^{(k-1)}(r)$ is the output of the neuron corresponding to position vector r on hierarchy (k−1), and
wherein the output value $y^{(k)}(r')$ for a neuron is computed based on the formula:

$$y^{(k)}(r') = f(u^{(k)}(r'))$$

where f(x) is a non-linear function.

2. The information processing apparatus according to claim 1, wherein said output value computation means omits the computation of an output value of neuron, when all the data to be referred to in computing the output value of neuron within the detection layer is not supplied by said supply means.

3. An image pickup device mounting the information processing apparatus according to claim 1.

4. An information processing method for detecting a predetermined pattern in an input image, comprising:
using a hierarchical neural network to perform the following steps, the hierarchical neural network having an input layer for inputting data and having a plurality of detection layers and integration layers arranged alternately, wherein (i) a first detection layer is configured to detect and output one or more feature amounts from the data input by the input layer, (ii) each detection layer except for the first detection layer is configured to detect and output one or more feature amounts from the output of the integration layer at the former stage, and (iii) the integration layer is configured to integrate the outputted features from the detection layer at the former stage and output the result of integration:

an output value computation step of sequentially setting each layer to be the current layer, computing an input sum for a neuron in the current layer using an output value of neuron within a former layer that precedes the current layer and a weight coefficient between the current layer and the former layer, and computing an output value for the neuron in the current layer based on the input sum;

a first storage control step of storing data of output values that are greater than or equal to a predetermined value in a memory, by comparing the output value of each neuron within a detection layer computed in the output value computation step to the predetermined value;

a second storage control step of storing data of the output value of each neuron within an integration layer computed in the output value computation step, in the memory; and a supply step of supplying the data of the output value of the neuron within the former layer that precedes the current layer, which is referred to in the output value computation step, by reading the data of the output value from the memory and of supplying data having a predetermined non-zero value instead of the data of the output value of a neuron not stored in the memory, wherein the input sum for a neuron is computed based on the formula:

$$u^{(k)}(r') = \sum_{r \in C(r')} w^{(k)}(r'-r) y^{(k-1)}(r)$$

where $u^{(k)}(r')$ is the input sum of a neuron corresponding to position vector r on hierarchy k, $w^{(k)}(r'-r)$ is a weight coefficient indicating the strength of coupling between the neuron corresponding to position vector r' on hierarchy k and the neuron corresponding to position vector r on hierarchy (k−1), and $y^{(k-1)}(r)$ is the output of the neuron corresponding to position vector r on hierarchy (k−1), and wherein the output value $y^{(k)}(r')$ for a neuron is computed based on the formula:

$$y^{(k)}(r') = f(u^{(k)}(r'))$$

where f(x) is a non-linear function.

5. A computer readable storage medium storing a program for causing an information processing apparatus to perform a method according to claim 4.

* * * * *